(12) United States Patent
Schatz et al.

(10) Patent No.: US 11,035,264 B2
(45) Date of Patent: Jun. 15, 2021

(54) INTERNAL COMBUSTION ENGINE FOR A MOTOR VEHICLE

(71) Applicant: Mahle International GmbH, Stuttgart (DE)

(72) Inventors: Daniel Schatz, Stuttgart (DE); Johannes Weinmann, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 16/886,615

(22) Filed: May 28, 2020

(65) Prior Publication Data

US 2020/0291833 A1    Sep. 17, 2020

Related U.S. Application Data

(63) Continuation of application No. PCT/EP2018/082215, filed on Nov. 22, 2018.

(30) Foreign Application Priority Data

Nov. 28, 2017 (DE) .................. 10 2017 221 318.3

(51) Int. Cl.
*F01M 13/00* (2006.01)
*F01M 11/10* (2006.01)
(Continued)

(52) U.S. Cl.
CPC ............... *F01M 1/20* (2013.01); *F01M 1/02* (2013.01); *F01M 13/021* (2013.01);
(Continued)

(58) Field of Classification Search
CPC ..... F02D 41/22; F02D 2250/08; F01M 11/10; F01M 13/00; F01M 2013/0083; F01M 2013/026; F01M 2250/60
See application file for complete search history.

(56) References Cited

U.S. PATENT DOCUMENTS

| 4,557,226 A | 12/1985 | Mayer et al. |
| 6,105,557 A | 8/2000 | Schnaibel et al. |

(Continued)

FOREIGN PATENT DOCUMENTS

| CH | 664798 A5 | 3/1988 |
| DE | 19834332 A1 | 2/2000 |

(Continued)

OTHER PUBLICATIONS

International Preliminary Report on Patentability of the European Patent Office in PCT/EP2018/082215 (from which this application claims priority) dated Nov. 28, 2019 and English-language translation thereof.

(Continued)

*Primary Examiner* — Long T Tran
(74) *Attorney, Agent, or Firm* — Falk Ewers; Ewers IP Law PLLC

(57) ABSTRACT

An internal combustion engine for a motor vehicle includes a crankcase ventilation device for removing blow-by gas from a crankcase, a pressure sensor being provided for measuring the gas pressure in said crankcase, and a control unit connected to and in communication with the crankcase ventilation device being configured and/or programmed to run a tightness test for said crankcase ventilation device when the internal combustion engine is switched off.

14 Claims, 1 Drawing Sheet

(51) Int. Cl.
*F02D 41/22* (2006.01)
*F01M 1/20* (2006.01)
*F01M 1/02* (2006.01)
*F01M 13/02* (2006.01)
*F01M 13/04* (2006.01)

(52) U.S. Cl.
CPC ..... *F01M 13/04* (2013.01); *F01M 2001/0215* (2013.01); *F01M 2013/026* (2013.01)

(56) References Cited

U.S. PATENT DOCUMENTS

| | | | |
|---|---|---|---|
| 6,234,152 | B1 | 5/2001 | Fritz et al. |
| 6,779,388 | B2 | 8/2004 | Baeuerle et al. |
| 8,887,559 | B2 | 11/2014 | Kuhn et al. |
| 9,238,980 | B2 | 1/2016 | An et al. |
| 10,551,273 | B2 | 2/2020 | Haslbeck et al. |
| 2001/0047801 | A1* | 12/2001 | Baeuerle ............ F02M 25/06 123/574 |
| 2002/0096158 | A1* | 7/2002 | Murakami ......... F02D 35/0038 123/690 |
| 2008/0110443 | A1* | 5/2008 | Hirano ................ F01M 13/021 123/572 |
| 2015/0020785 | A1* | 1/2015 | An ........................ F01M 13/04 123/572 |
| 2017/0167909 | A1* | 6/2017 | Dudar ................. G01M 17/007 |
| 2017/0268448 | A1* | 9/2017 | Takahashi ............ F01M 13/023 |
| 2017/0328810 | A1* | 11/2017 | Yaeo ..................... G01M 15/02 |
| 2018/0030937 | A1 | 2/2018 | Golladay et al. |
| 2018/0283976 | A1* | 10/2018 | Shiwa ................. G01M 3/3236 |
| 2018/0371971 | A1* | 12/2018 | Nakano ................. G01M 3/025 |
| 2019/0085996 | A1* | 3/2019 | Chen ................... F01M 13/0011 |
| 2019/0108693 | A1* | 4/2019 | Dudar ................ F02M 25/0809 |
| 2019/0226368 | A1* | 7/2019 | Hofmann ............. F01M 13/00 |

FOREIGN PATENT DOCUMENTS

| | | |
|---|---|---|
| DE | 19836967 C2 | 6/2000 |
| DE | 10026492 A1 | 11/2001 |
| DE | 102004030908 A1 | 1/2006 |
| DE | 102007046465 A1 | 4/2009 |
| DE | 102010040900 A1 | 3/2012 |
| DE | 102012220800 A1 | 5/2014 |
| DE | 102013225388 A1 | 6/2015 |
| DE | 102015203694 A1 | 9/2016 |
| DE | 102015213982 A1 | 1/2017 |
| DE | 102016201589 B3 | 6/2017 |
| JP | 04019312 A | 1/1992 |
| WO | 2013120820 A1 | 8/2013 |

OTHER PUBLICATIONS

International Search Report of the European Patent Office in PCT/EP2018/082215 (from which this application claims priority) dated Feb. 28, 2019 and English-language translation thereof.

* cited by examiner

INTERNAL COMBUSTION ENGINE FOR A MOTOR VEHICLE

CROSS REFERENCE TO RELATED APPLICATIONS

This application is a continuation application of international patent application PCT/EP2018/082215, filed Nov. 22, 2018, designating the United States, and the entire content of both applications is incorporated herein by reference.

TECHNICAL FIELD

The present disclosure relates to an internal combustion engine for a motor vehicle, including an engine block, which contains at least one cylinder for a piston, and a crankcase, which adjoins the engine block and contains a crankshaft that is coupled to the respective piston, wherein a crankcase ventilation device for discharging blow-by gas from the crankcase is provided. The disclosure, furthermore, relates to a method for the leakage testing of the crankcase ventilation device of such an internal combustion engine.

BACKGROUND

In internal combustion engines, inner walls of each cylinder and the associated piston bound a combustion space, wherein the piston that is moveably mounted in the respective cylinder comprises at least one piston ring which, together with the piston, seals the crankcase against the combustion space. In order to ensure as low friction as possible, a movement of the piston a certain play is provided between the piston ring and the inner walls of the cylinder, so that a complete fluidic separation of the combustion space and of the crankcase is not attainable. For this reason, blow-by gas, in particular in the case of supercharged internal combustion engines, which utilize an increased pressure in the intake system for the increase of power, flows out of the combustion space into the crankcase where it steadily increases the gas pressure compared with the atmospheric pressure. This increased gas pressure can result in damage to the crankcase. In order to bring about a pressure reduction in the crankcase, a crankcase ventilation device for discharging the blow-by gas from the crankcase is utilized, wherein during the operation of the internal combustion engine a negative pressure in the region of −2 mbar relative to the ambient pressure of the internal combustion engine is typically aimed at.

From DE 10 2012 220 800 A1, DE 10 2015 203 694 A1 and CH 664 798 A5, combustion engines having crankcase ventilation devices are known.

In order for an internal combustion engine to satisfy legal and environmental requirement, the blow-by gas during the operation of the internal combustion engine should not escape unfiltered since it can contain minutest oil droplets, fuel residue and soot which have a harmful effect on the environment. For this reason, it is particularly important that possible leakages of the crankcase ventilation device are promptly detected following their development.

In DE 10 2007 046 465 A1 a device for the detection of leakages on crankcase ventilation devices is described, wherein on a connecting point, which is formed by two adjoining end pieces of two adjacent components of the crankcase ventilation device, a sensor element is provided. The sensor element includes electrical contacts which determine the electrical resistance value across the two adjoining end pieces, wherein the end pieces obviously have to be formed of electrically conductive material. When such end pieces for example are not correctly installed or the same become detached during the operation of the internal combustion engine, so that the electrically conductive connection between the end pieces is interrupted, the sensor element measures a very large resistance value, which deviates from a default set point value.

Although such a device makes possible detecting a connecting point that is not correctly installed, leakages of the components of the crankcase ventilation device cannot be detected, however. For example, a component of the crankcase ventilation device can have a leakage between two connecting points which is not detected with this device. A further disadvantage is that in the case of defective contacts of the sensor element a leakage is determined although the components of the crankcase ventilation device are faultless and tight.

From DE 10 2004 030 908 A1 an operating method for a crankcase ventilation system is known, with which, with switched-off internal combustion engine, a positive pressure in a gas path of the crankcase ventilation system is generated with a pump, in order to perform a leakage test.

SUMMARY

It is an object of the present disclosure to provide an internal combustion engine of the type described at the outset, which makes possible a leakage test of the crankcase ventilation device, wherein the leakage test should not be restricted to leakages at connecting points. Furthermore, a testing method suitable for this is sought.

According to an aspect of the disclosure, this problem is solved by a method for leakage testing a crankcase ventilation device of an internal combustion engine for a motor vehicle and an internal combustion engine for a motor vehicle as described herein.

The present disclosure is based on the general idea of creating a negative pressure in the crankcase and subsequently determine the gas pressure in the crankcase.

The internal combustion engine according to an aspect of the disclosure includes a crankcase ventilation device which includes an electrically driven delivery device which, with a blow-by gas line, is fluidically connected to the crankcase. The electrically driven delivery device can be configured as a fluid pump, wherein it can be preferred that the delivery device is a side channel compressor including a rotating blade impeller, which between an inlet and an outlet of the side channel compressor creates a pressure differential, wherein at the inlet a lower pressure than at the outlet is present. In an operating mode, the delivery device creates a negative pressure in the blow-by gas line, as a result of which the blow-by gas is sucked in or driven out of the crankcase in the direction of the delivery device. Furthermore, at least one pressure sensor is present in the internal combustion engine, which measures the gas pressure in the crankcase. Both the crankcase ventilation device, in particular delivery device, and also the pressure sensor are each connected to communicate to a control device, wherein this control device can be configured for open-loop controlling and/or closed-loop controlling the internal combustion engine.

Here, a communicating connection is to mean that between two components that are connected in communication to one another a bidirectional or unidirectional data connection can be provided, with which electrical open-loop control, closed-loop control and/or measurement signals are transmittable in analogue or digital form. The communication between more than two components of the internal combustion engine can be realized with a bus system.

The control unit is equipped and/or programmed for carrying out a leakage test of the crankcase ventilation device with switched-off internal combustion engine. During such a leakage test the fact that the crankcase of the switched-off internal combustion engine has a certain fluidic tightness relative to the respective combustion space is utilized. For as long as the crankcase ventilation device does not have any leakages, the fluidic tightness of the crankcase relative to the surroundings of the internal combustion engine or atmosphere is substantially defined by the tightness between the crankcase and the respective combustion space. However, should leakages occur in the region of the crankcase ventilation device, the fluidic tightness of the crankcase is also reduced relative to the surroundings of the internal combustion engine.

The fluid tightness of the crankcase can be determined by measurement of the gas pressure in the crankcase using the pressure sensor, wherein this gas pressure measurement can be performed for example at a predetermined time or can also continuously take place for a defined measurement time in order to determine the rate of change of the gas pressure in the predetermined measurement time. At least one set-point value of the gas pressure of the crankcase is stored in the control unit and, during the carrying out of a leakage test, is compared with at least one actual value of the gas pressure that is determined by the pressure sensor.

By way of this, a leakage test of the crankcase ventilation device is made possible while leakages outside the connecting points are also reliably detected.

Furthermore, the disclosure relates to a method for the leakage test of a crankcase ventilation device of an internal combustion engine according to an aspect of the disclosure, wherein with switched-off internal combustion engine the delivery device is switched on and operated for a predetermined time span for creating a negative pressure in the crankcase. At a predetermined time following the switching-off of the delivery device, the gas pressure in the crankcase is compared with a predetermined tolerance gas pressure range, wherein an error message is generated when the gas pressure measured at the predetermined time is outside the tolerance gas pressure range. This comparison is typically carried out by the control unit of the internal combustion engine, wherein the control unit typically also generates and for example submits the error message to a diagnostic interface.

The negative pressure in the crankcase is continuously reduced following the switching-off of the delivery device since blow-by gas from the respective combustion space is sucked into the crankcase. The rate, with which the gas pressure in the crankcase increases after the switching-off of the delivery device, is substantially determined by the fluidic tightness between the crankcase and the respective combustion space. This fluidic tightness is influenced to a certain extent by factors such as the ambient temperature of the internal combustion engine, the operating mode of the internal combustion engine prior to its deactivation and the wear between piston ring and the inner wall of the respective cylinder that occurs over time. For this reason, it is practical to not compare the gas pressure in the crankcase with a fixed individual value but with a tolerance gas pressure range including typical gas pressure values of the crankcase as a function of practical influence factors. When the gas pressure in the crankcase, through leakages of the crankcase ventilation device, is outside this tolerance gas pressure range, an error message is generated by the control unit and for example stored in an error memory, wherein the error can then be read out by a specialist during maintenance using a suitable diagnostic device. On the other hand, it can also be provided that in the case of an unusually great deviation from the tolerance gas pressure range the user of the motor vehicle is informed by way of vehicle electronics and corresponding displays, in order to have an inspection carried out before a scheduled maintenance.

According to an aspect of the disclosure, it is provided that the predetermined time span amounts to at least 1 second and a maximum of 10 seconds or maximum of 5 seconds, typically at least 2 seconds and a maximum of 4 seconds, particularly typically 3 seconds. These time spans for creating a negative pressure in the crankcase are necessary in order to generate a negative pressure that is sufficient for carrying out a leakage test. The predetermined time span depends on the desired negative pressure, volume of the crankcase and the design of the delivery device.

According a further aspect of the disclosure, it is provided that the predetermined time amounts to at least 1 second and a maximum of 4 seconds, typically at least 2 seconds and a maximum of 3 seconds, particularly typically 2 seconds. These times, during which the gas pressure in the crankcase following the deactivation of the delivery device is measured with the pressure sensor are selected so that an increase or change of the gas pressure in the crankcase is achieved, which is outside the measurement uncertainty of the pressure sensor and thus makes possible a reliable gas pressure measurement.

According to a further aspect of the disclosure, it is provided that the tolerance gas pressure range has a width of 10 mbar. The width of the tolerance gas pressure range means the difference between the upper limit and the lower limit of the gas pressure range. It has been shown that the influence factors mentioned above, which influence the tightness between the respective combustion space and the crankcase, typically cause fluctuations of the gas pressure in the crankcase in a range that is less than 10 mbar.

According to a further aspect of the disclosure, it is provided that the tolerance gas pressure range is 10 mbar above a gas pressure which, upon deactivation of the delivery device, is present in the crankcase. Here, above is to mean that the difference between the lower limit of the gas pressure range and the gas pressure, which is present in the crankcase during the deactivation of the delivery device, has a positive sign. It can be provided that the gas pressure, which is present in the crankcase in the deactivation of the delivery device, corresponds to approximately −60 mbar and the tolerance gas pressure range extends approximately from −50 to −40 mbar.

According to another aspect of the disclosure, it is provided that the tolerance gas pressure range has a width which is as large as a distance of a lower limit of the tolerance gas pressure range from a gas pressure that is present in the crankcase when the delivery device is switched off. Advantageous in this is that the tolerance gas pressure range is adequately chosen in order to include typical fluctuations of the gas pressure in the crankcase.

In an exemplary embodiment of the internal combustion engine, it is provided that the control device is configured and/or programmed such that for the leakage test of the crankcase ventilation device it carries out the methods mentioned above.

According to a further aspect of the disclosure, it is provided that the crankcase ventilation device includes an oil separator for separating oil from the blow-by gas, which is arranged in the blow-by gas line downstream of the delivery device, wherein the oil separator includes an oil collection space for collecting the separated oil and a return line for returning the separated oil from the oil collection space to the crankcase. Here, the return line establishes a fluidic connection between the oil collection space and the crankcase. The oil separator can be designed for example as a centrifugal separator, impactor or disc separator. Regardless of whether the blow-by gas is supplied to the surroundings of the combustion engine or again to the combustion space, the separation of the oil from the blow-by gas has the advantage that the oil consumption of the internal combustion engine is substantially reduced. Alternatively, a filter can also be provided in place of such an oil separator. It is likewise conceivable to use such an oil separator and a filter.

According to a further aspect of the disclosure, it is provided that the delivery device and the oil separator are combined in a common housing to form a separator module. Here, the separator module can include a raw air inlet and a clean air outlet, wherein the oil separator is arranged between the raw air inlet and the clean air outlet so that it fluidically separates these from one another, so that the blow-by gas gets from the raw air inlet to the clean air outlet substantially only through the oil separator. The delivery device for driving the blow-by gas can typically be arranged between the raw air inlet and the oil separator. Combining the delivery device and the oil separator to form a separator module has the advantage that the exchange in the case of a defect is facilitated for the respective specialist and maintenance costs of the internal combustion engine are thus reduced.

According to a further aspect of the disclosure, it is provided that the pressure sensor is arranged at the inlet of the delivery device and/or on the crankcase and/or in the blow-by gas line upstream of the delivery device. The use of multiple pressure sensors can be advantageous in order to locate a leakage with a single measurement, since the gas pressure changes at the respective pressure sensor have different rates of change which allow deducing the position of a leakage. When using a single pressure sensor, the place of installation substantially depends on the design of the internal combustion engine.

According to a further aspect of the disclosure, it is provided that the pressure sensor is arranged on the separator module in order to equip an internal combustion engine, with preferably few operations, with a system for the leakage testing of the crankcase ventilation device according to an aspect of the disclosure and thereby reduce the manufacturing costs of the internal combustion engine.

According to yet a further aspect of the disclosure, it is provided that the internal combustion engine includes a fresh air system for feeding fresh air to the respective cylinder and the blow-by gas line feeds the blow-by gas to the fresh air system or surroundings of the internal combustion engine. The fresh air system filters for example dust out of the sucked-in ambient air which among other things also contains quartz, which together with lubricating oils employed in the internal combustion engine would form a grinding paste, which results in increased wear of the internal combustion engine. Since the blow-by gas can include uncombusted fuel, the same, during the feeding to the fresh air system, can be once more fed to the respective internal combustion engine, such that these uncombusted pollutants do not enter the environment.

According to a further aspect of the disclosure, it is provided that a non-return blocking valve is arranged downstream of the pressure sensor in the blow-by gas line or on the delivery device, which blocks in the direction of the crankcase. In this way, the space volume to be tested during the leakage test of the crankcase ventilation device is fluidically sealed relative to the surroundings of the internal combustion engine.

According to a further aspect of the disclosure, it is provided that the non-return blocking valve is arranged in the separator module in order to make possible as simple and cost-effective as possible an installation of the system for the leakage testing of the crankcase ventilation device.

Further important features and advantages of the disclosure are obtained from the claims, from the drawings and from the associated figure description with the help of the drawings.

It is to be understood that the features mentioned above and still to be explained in the following cannot only be used in the respective combination stated but also in other combinations or by themselves without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
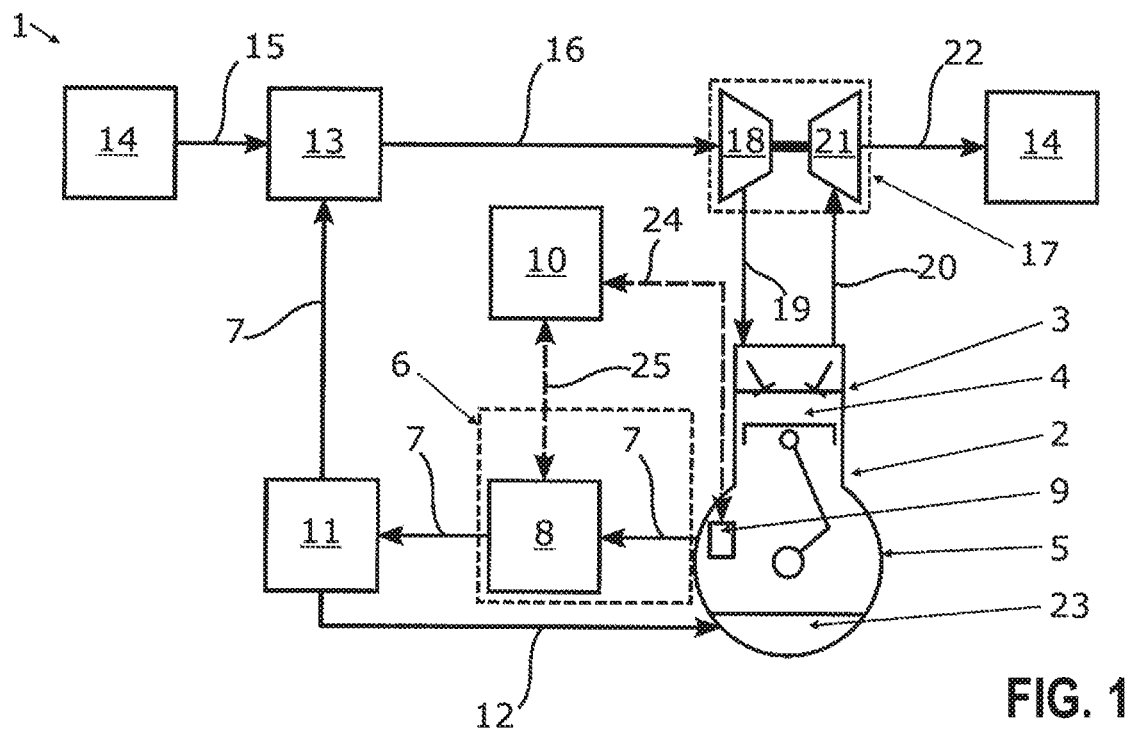
FIG. 1 shows a schematic diagram of an internal combustion engine having a crankcase ventilation device according to a first exemplary embodiment of the disclosure.

Exemplary embodiments of the disclosure are shown in the drawings and are explained in more detail in the following description, wherein same reference characters relate to same or similar or functionally same components.

Figure 2:
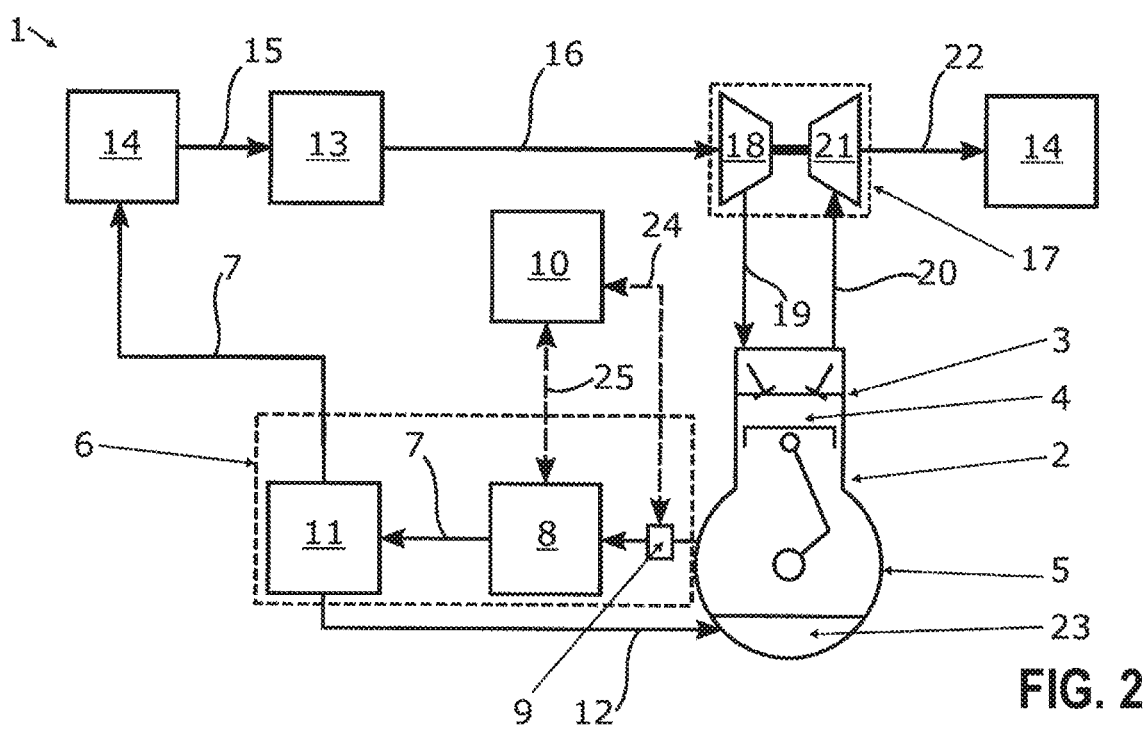
FIG. 2 shows a schematic diagram of an internal combustion engine having a crankcase ventilation device according to a second exemplary embodiment of the disclosure.

As shown in FIGS. 1 and 2, an internal combustion engine 1 according to an exemplary embodiment of the disclosure is fluidically interacting with its surroundings 14, wherein by way of a raw air inlet 15, raw air can be drawn from the surroundings 14 and fed to the internal combustion engine 1. Following the utilization of the raw air in the internal combustion engine 1, the same is again fed to the surroundings 14 in the form of exhaust gases by way of an exhaust gas outlet 22. Such an internal combustion engine 1 can be configured for example as a spark-ignition or diesel engine.

Downstream of the raw air inlet 15 a fresh air system 13 is provided, which can include a housing with an inlet and an outlet, wherein the raw air inlet 15 opens into the inlet and a fresh air line 16 connects to the outlet. Here, a filter element can be arranged in the housing such that it fluidically separates the inlet and outlet from one another, such that the raw air sucked in from the surroundings 14 has to substantially flow through the filter element and is therefore freed of contamination, which could result in increased wear of the internal combustion engine 1.

Downstream of the fresh air system 13 a charging device 17 is provided, into which the fresh air line 16 leads. The charging device 17 is fluidically connected, via the charge air line 19 and the exhaust line 20, to at least one cylinder 3 of an engine block 2 of the internal combustion engine 1. Within each cylinder 3 a piston 4 is moveably mounted and coupled to a crankshaft which is provided in a crankcase 5, which adjoins the engine block 2. A region of the crankcase 5, which is located opposite the engine block 2, forms an oil pan 23, in which the oil needed for the lubrication of the components of the internal combustion engine 1 is collected.

Each piston 4 and the associated adjoining inner walls of each cylinder 3 bound a combustion space which is fluidically connected to the charge air line 19 and exhaust line 20. By way of the charge air line 14, the clean air needed for the combustion process is supplied and the exhaust gases generated by the combustion process are discharged from the combustion space via the exhaust line 20. In order to achieve a fine sealing of the respective combustion space relative to the crankcase 5, each piston 4 is provided with at least one piston ring that is not shown, which is arranged between the receptive piston 4 and the inner walls of the respective piston 3.

The charging unit 17 includes a compressor 18 and an exhaust gas turbine 21, which are coupled to one another by way of a rotatably mounted shaft. The exhaust gases, which are generated in the combustion space during the combustion process flow through the exhaust line 20 and drive the exhaust gas turbine 21, which in turn drives the compressor 18 by way of the rotatably mounted shaft. Such a charging unit 17, which can be formed as an exhaust gas turbocharger, substantially operates free of loss since it does not require any drive power from the crankshaft. The compressor 18 can be configured as a compressor wheel and sucks in the fresh air via the fresh air line 16 and compresses the same in order to feed pre-compressed fresh air or charge air to the combustion process via the charge air line 19. By way of this, a power or efficiency increase of the internal combustion engine 1 is achieved.

The charge air compressed by the compressor 18 has a temperature that is elevated compared with the uncompressed fresh air. In order to further increase the power of the internal combustion engine 1, a charge air cooler which is not shown can be provided in the charge air line 19 between the compressor 18 and the respective cylinder 3 in order to cool the charge air and thus further increase its density. In order to avoid damaging the components of the internal combustion engine 1 by the elevated pressure of the charge air, the charge air line 19 can include a boost pressure control which is not shown, which can be configured for example as a throttle valve.

To ensure that the respective piston 4 can move with the lowest friction possible in the respective cylinder 3, a certain play is provided between the piston ring belonging to the piston 4 and the inner walls of the cylinder 3, such that a complete fluidic separation of the combustion space and of the crankcase 5 is not possible. For this reason, a fraction of this mixture flows into the crankcase 5 during the compression and/or igniting of the fuel-air mixture in the combustion space and is referred to as blow-by gas. This effect manifests itself in particular in internal combustion engines 1 which utilize a charging unit 17 for increasing the power.

This elevated gas pressure can result in that oil from the crankcase 5 leaks out of the engine block 2 through seals which are not shown. In order to reduce the gas pressure in the crankcase 5 during the operation of the internal combustion engine 1, the internal combustion engine 1 is equipped with a crankcase ventilation device 6, which in the exemplary embodiment shown in of FIG. 1 includes a delivery device 8, which is fluidically connected to the crankcase 5 via a blow-by gas line 7. The delivery device 8, which can be configured for example as a fluid pump with an electric drive, typically generates a negative pressure in the crankcase 5 in the region of −2 mbar. The blow-by gas line 7 is arranged on the crankcase 5 such that during the operation of the crankcase ventilation device 6 typically no oil is sucked in from the oil pan 23.

The delivery device 8 is connected to and in communication with a control device 10 via at least one control line 25, wherein the control line 25 typically represents a bidirectional connection, such that on the one hand electrical signals for open-loop controlling and/or closed-loop controlling of the delivery device 8 can be transmitted from the control device 10 and on the other hand operating information of the delivery device 8 can be transmitted to the control unit 10. The control unit 10 can be connected with further control lines that are not shown for open-loop controlling and/or closed-loop controlling the internal combustion engine 1 and additionally be connected to and in communication with further electronic components of a motor vehicle, such as for example display elements, operating elements or diagnostic interfaces. Multiple signal lines 25 can be combined as a bus system.

The blow-by gas, which enters the crankcase 5 during the operation of the internal combustion engine 1, absorbs minutest oil droplets so that a fine oil mist is formed. In order to protect the environment and also reduce the oil consumption of the internal combustion engine 1, an oil separator 11 is provided downstream of the delivery device 8, in which the oil droplets are separated from the blow-by gas. The oil separator 11 is fluidically connected to the delivery device 8 by the blow-by gas line 7 and can include an oil collection space for collecting the separated oil, wherein this oil collection space is fluidically connected to the crankcase 5, typically to the oil pan 23 with a return line 12. While the delivery device 8, in the blow-by gas line 7 between itself and the crankcase 5 generates a negative pressure, it generates a positive pressure between itself and the oil separator 11, such that blow-by gas flows into the oil separator 11. This positive pressure can also be utilized in order to deliver the separated oil into the crankcase 5 via the return line 12.

In the exemplary embodiment shown in FIG. 1, the oil separator 11 is fluidically connected to the fresh air system 13 of the internal combustion engine 1 by the blow-by gas line 7, such that the blow-by gas freed of the oil mist can be again fed to the combustion process of the internal combustion engine 1. As a result, unutilized fuel portions for example which during the combustion step by way of the piston 4 have entered the crankcase 5 with the blow-by gas, are still utilizable, such that the uncombusted pollutants do not enter the surroundings of the internal combustion engine 1, i.e., the environment.

During the operation of the internal combustion engine 1, the delivery device 8 has a suction capacity which is matched to the volume of the crankcase 5 such that the blow-by gas that is already present in the crankcase 5 is sucked out but typically no additional blow-by gas is sucked out of the combustion chamber. In order to perform a leakage test of the crankcase ventilation device 6 a lower negative pressure or a lower gas pressure has to be created in the crankcase 5 than during the operation of the internal combustion engine 1, such that even minutest leakages of the crankcase ventilation device 6 can be securely determined. In contrast with the continuous operation of the delivery device 8 during the operation of the internal combustion engine 1, the delivery device 8, with switched-off internal combustion engine 1, is operated only for a predetermined time span for creating the negative pressure in the crankcase 5. Upon the deactivation of the delivery device 8, pressure equalization between the respective combustion space of each cylinder 3 and the crankcase 5 commences by way of the negative pressure in the crankcase 5, such that the gas pressure in the crankcase 5 increases again. During this pressure equalization, blow-by gas flows between the respective piston ring and the inner wall of the respective cylinder 3 into the crankcase 5.

Downstream of the crankcase 5, a non-return blocking valve which is not shown can be provided, which blocks a fluidic exchange in the direction of the crankcase 5. With a crankcase ventilation device 6 which does not have any leakages, the pressure gas increase in the crankcase 5 is substantially dependent only on the fluidic tightness between the respective combustion chamber and the crankcase 5. In the case that the crankcase ventilation device 6 has leakages, the pressure increase in the crankcase 5, at a predetermined time following the deactivation of the delivery device 8, is greater than a predetermined set point value or set point value range and thus an indicator for the presence of these leakages.

The gas pressure in the crankcase 5 is determined with at least one pressure sensor 9 which, as shown in FIG. 1, can be arranged on or in the crankcase 5. However, it is also conceivable that the pressure sensor 9 is arranged at the inlet of the delivery device 8 or in the blow-by gas line 7 upstream of the delivery device 8. It can also be provided that multiple pressure sensors 9 are utilized, which can be installed in the positions mentioned above. The at least one pressure sensor 9 is connected to and in communication with the control device 10 by at least one signal line 24, wherein a bidirectional or unidirectional connection is conceivable. In the case of multiple pressure sensors 9, the associated signal lines 24 can be combined to form a bus system, wherein such a bus system can also be configured such that it includes the signal lines 24 and control lines 25 connected to the control unit 10.

The control unit 10 is configured and/or programmed for carrying out a leakage test of the crankcase ventilation device 6 with switched off internal combustion engine 1. It can be provided that the control unit 10 carries out the leakage test after every deactivation of the internal combustion engine 1 or only when a certain number of deactivations of the internal combustion engine 1 have taken place. In addition, it can be provided that the leakage test can be initiated by a diagnostic interface which is not shown, which is connected to and in communication with the control unit 10. Thus, the leakage test can be carried out by a specialist during scheduled maintenance.

The control unit 10 has at least one non-volatile memory, in which at least a predetermined time span is stored. As soon as the control unit 10 detects that the internal combustion engine 1 is switched off and a leakage test of the crankcase ventilation device 6 is to be carried out, a control signal is transmitted to the delivery device 8 via the control lines 25, as a result of which the delivery device 8 is started and a negative pressure generated in the crankcase 5. The desired negative pressure in the crankcase 5 can be provided for example at a constant rotational speed of the electric drive of the delivery device 8, which is also provided during the operation of the internal combustion engine 1, by way of a fixed predetermined time span. On the other hand it can also be provided that for the leakage test the electric drive of the delivery device 8 is operated with a rotational speed that is higher than during the operation of the internal combustion engine 1, so that a shorter predetermined time span up to the reaching of the desired negative pressure is required. The predetermined time span substantially depends on the volume of the crankcase 5 and the design or rate of delivery of the delivery device 8.

Once the predetermined time span has expired, the control unit 10 sends a signal to the delivery device 8 via the control lines 25 in order to switch off the same. As a result, the non-return blocking valve, which is not shown, and which is arranged downstream of the crankcase 5, also closes. The pressure sensor 9 measures the gas pressure in the crankcase 5 and transmits this value to the control unit 10 via the signal line 24. It can be provided that the pressure sensor 9 continuously transmits measurement values to the control unit 10. It can also be provided that the pressure sensor 9 transmits a measurement value to the control unit 10 only when the same requests the measurement value of the gas pressure at a predetermined time following the deactivation of the delivery device 8. At the predetermined time following the deactivation of the delivery device 8, the gas pressure in the crankcase 5 is compared by the control unit 10 with a predetermined tolerance pressure range, wherein an error message is generated by the control unit 10 when the gas pressure measured at the predetermined time is outside the tolerance gas pressure range. At least one predetermined time and at least one predetermined tolerance gas pressure range are stored in the control unit 10.

The comparison of the gas pressure in the crankcase 5 with a tolerance gas pressure range at the predetermined time is more practical than the comparison with an individual set point value of the gas pressure, since the fluidic tightness between the respective combustion chamber and the crankcase 5 depends for example on the ambient temperature and also on the operating mode of the internal combustion engine prior to the leakage test. It has been shown that a tolerance gas pressure range with a typical width of 10 mbar is suitable in order to carry out a reliable leakage test of the crankcase ventilation device 6.

It can be provided that the control unit 10 stores the measurement value of the gas pressure in the crankcase 5 after every leakage test and provides the same with a timestamp such that a possible change of the fluidic tightness of the crankcase 5 and/or of the crankcase ventilation device 6 can be determined, which is not based on additional leakages but for example can be an indication for wear of the piston rings.

The exemplary embodiment of the internal combustion engine 1 shown in FIG. 2 incudes a crankcase ventilation device 6 which is configured as separator module, in which the delivery device 8 and the oil separator 11 are combined, wherein the pressure sensor 9 is also installed in this separator module. Additionally, it can be provided that a non-return blocking valve which is not shown, is arranged in the separator module downstream of the pressure sensor 9. Such a construction, which combines multiple components, simplifies the manufacture and if required also the repair of the internal combustion engine 1. In the case of a combination of the delivery device 8 and of the oil separator 11 to form a separator module, it is typically provided that the delivery device 8 is configured as a side channel compressor and the oil separator as an impactor.

In contrast with the exemplary embodiment of the internal combustion engine 1 shown in FIG. 1, the blow-by gas, in the exemplary embodiment of the internal combustion engine 1 shown in FIG. 2, is not fed to the fresh air system 13 but flows into the surroundings 14 of the internal combustion engine 1 via the blow-by gas line 7.

It is understood that the foregoing description is that of the exemplary embodiments of the disclosure and that various changes and modifications may be made thereto without departing from the spirit and scope of the disclosure as defined in the appended claims.

What is claimed is:

1. A method for leakage testing a crankcase ventilation device of an internal combustion engine for a motor vehicle, the motor vehicle including an engine block, which contains at least one cylinder for a piston, a crankcase, which adjoins the engine block, including the crankcase ventilation device for discharging blow-by gas from the crankcase, the crankcase ventilation device including a blow-by gas line and an electrically driven delivery device for driving the blow-by gas in the blow-by gas line, the blow-by gas line fluidically connecting the crankcase with a delivery device, a pressure sensor for measuring a gas pressure in the crankcase, and a control device for activating the crankcase ventilation device, the method comprising:

connecting the pressure sensor to and communicating with the control device;

programming the control device to carry out a leakage test of the crankcase ventilation device by switching on and operating the electrically driven delivery device for a predetermined period of time to create a negative pressure in the crankcase upon detecting that the internal combustion engine is switched off;

comparing at a predetermined time following deactivation of the delivery device the gas pressure in the crankcase with a predetermined tolerance gas pressure range; and creating an error message when the gas pressure measured at a predetermined time is outside a tolerance gas pressure range.

2. The method according to claim 1, wherein the predetermined time span amounts to at least one of (i) at least 1 second and maximally 5 seconds, (ii) at least 2 seconds and maximally 4 seconds, and (iii) 3 seconds.

3. The method according to claim 1, wherein the predetermined time amounts to at least one of (i) at least 1 second and maximally 4 seconds, (ii) at least 2 seconds and maximally 3 seconds, and (iii) 2 seconds.

4. The method according to claim 1, wherein the tolerance gas pressure range has a width of 10 mbar.

5. The method according to claim 1, wherein the tolerance gas pressure range is 10 mbar above the gas pressure, which is present in the crankcase upon deactivation of the delivery device.

6. The method according to claim 1, wherein the tolerance gas pressure range has a width which is so great as a distance of a lower limit of the tolerance gas pressure range from the gas pressure which is present in the crankcase upon deactivation of the delivery device.

7. The internal combustion engine for the motor vehicle, the internal combustion engine comprising:

the engine block, which contains the at least one cylinder for the piston;

the crankcase, which adjoins the engine block;

the crankcase ventilation device for discharging the blow-by gas from the crankcase, wherein the crankcase ventilation device comprises the blow-by gas line and the electrically driven delivery device for driving the blow-by gas in the blow-by gas line, and wherein the blow-by gas line fluidically connects the crankcase with the delivery device;

the pressure sensor for measuring the gas pressure in the crankcase;

the control device for activating the crankcase ventilation device, wherein the pressure sensor is connected to and in communication with the control device, wherein the control device is programmed to carry out the leakage test of the crankcase ventilation device with switched off internal combustion engine, and wherein the control device is programmed such that for the leakage test of the crankcase ventilation device the control device carries out the method according to claim 1.

8. The internal combustion engine according to claim 7, wherein the crankcase ventilation device comprises an oil separator for separating oil from the blow-by gas, which is arranged in the blow-by gas line downstream of the delivery device, and which comprises an oil collection space for collecting the separated oil and a return line for returning the separated oil from the oil collection space to the crankcase.

9. The internal combustion engine according to claim 8, wherein the delivery device and the oil separator are combined in a common housing to form a separator module.

10. The internal combustion engine according to claim 9, wherein the pressure sensor is arranged on the separator module.

11. The internal combustion engine according to claim 7, wherein the pressure sensor is arranged at an inlet of the delivery device and/or on the crankcase and/or in the blow-by gas line upstream of the delivery device.

12. The internal combustion engine according to claim 7, wherein the internal combustion engine comprises a fresh air system for feeding fresh air to the respective cylinder, and the blow-by gas line feeds the blow-by gas to the fresh air system or the surroundings of the internal combustion engine.

13. The internal combustion engine according to claim 7, wherein a non-return blocking valve is arranged downstream of the pressure sensor in the blow-by gas line or on the delivery device, which blocks in a direction of the crankcase.

14. The internal combustion engine according to claim 13, wherein the non-return blocking valve is arranged in a separator module.

* * * * *